Nov. 1, 1927.
W. A. MARRISON
ELECTRICAL GENERATOR
Filed July 12, 1924
1,647,645
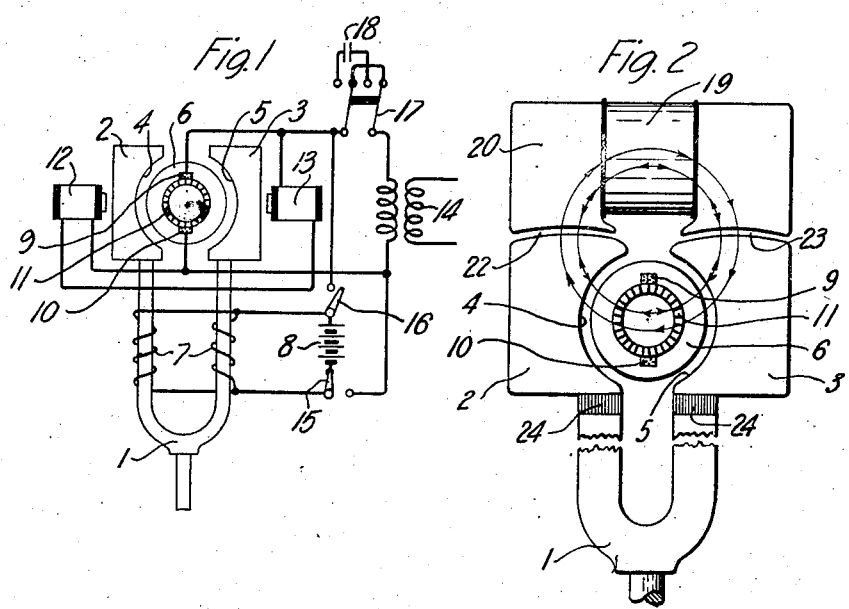
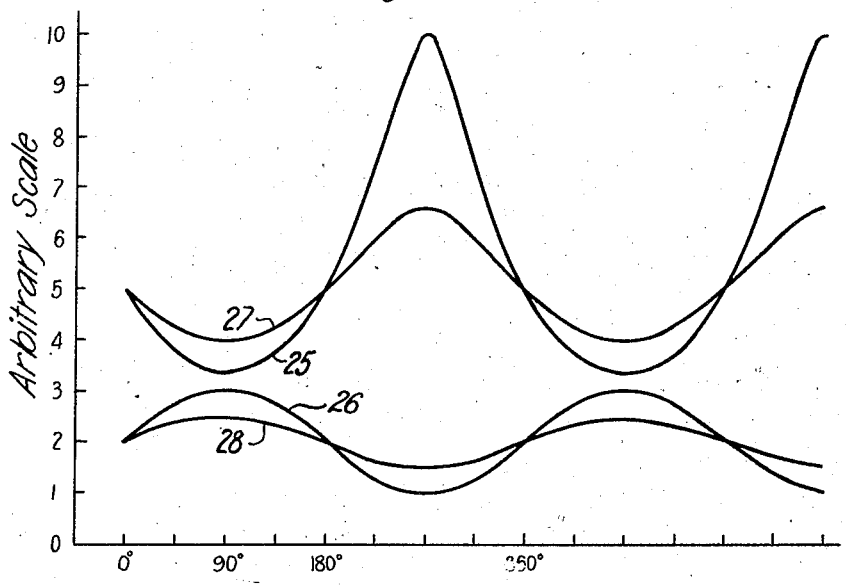
Inventor:
Warren A. Marrison
by ———— Atty.

Patented Nov. 1, 1927.

1,647,645

UNITED STATES PATENT OFFICE.

WARREN A. MARRISON, OF EAST ORANGE, NEW JERSEY, ASSIGNOR TO WESTERN ELECTRIC COMPANY, INCORPORATED, OF NEW YORK, N. Y., A CORPORATION OF NEW YORK.

ELECTRICAL GENERATOR.

Application filed July 12, 1924. Serial No. 725,603.

This invention relates to electrical generators and more particularly to constant frequency alternating current generators.

The object of this invention is to provide a generator that shall have extreme frequency stability.

A feature of the invention resides in driving a mechanically resonant system at its natural frequency to obtain an alternating current having the same electrical frequency as the mechanical vibrations of the resonant system.

Fig. 1 is a schematic drawing of the system;

Fig. 2 is a constructional arrangement of the component parts; and

Fig. 3 shows various curves indicating the relation between the mechanical and the magnetic alternations.

Referring to Fig. 1, numeral 1 indicates a vibratile tuning fork having loaded prongs 2 and 3, preferably of soft iron, the inner faces of which, 4 and 5, are shaped in a semi-circular section to enclose an armature 6 which may be rotated by any suitable means. The prongs 2 and 3 act as opposite poles of the magnetizing field, the field winding 7 being excited by the battery 8.

A portion of the generated current collected from the commutator 11, by the brushes 9 and 10, is shunted through the electromagnets 12 and 13 which drive the prongs 2 and 3 magnetically in accordance with the frequency of the generated current. Numeral 14 designates the output transformer, the primary winding of which may be placed in the field circuit upon the closure of the single-pole single-throw switch 16, and the reversal of the single-pole double throw switch 15, which disconnects the battery 8. The reversal of the double-pole double-throw switch 17 places the condenser 18 in the field circuit.

Fig. 2 shows a preferred embodiment of my invention in which the magnetic flux is carried entirely by the elements 2, 3, 6 and 20, the frames of which may be laminated to minimize eddy current losses, the magnetic flux flowing from 19 through 20 across the constant air gaps 22 and 23 to the generator poles 2 and 3 in a path approximately as indicated by the single arrow line. The magnetic poles 2 and 3 of the fork are connected to the remainder 1 by means of blocks of non-magnetic material 24 to prevent flux leakage. Numeral 19 designates a continuous winding arranged to include the field winding 7 which is excited by the direct current component of the generated current, being placed across the brushes 9 and 10 in parallel with the primary of the output transformer 14, the latter having a condenser 18 placed in series to prevent the loss of the direct current component, and to eliminate the direct component of the flux, as is shown diagrammatically in Fig. 1 and the windings of magnets 12 and 13 which are excited by the alternating current component generated by the rotating armature 6 in the magnetic field between poles 2 and 3. The impedances of the direct-current alternating current circuit and the alternating current circuit are so proportioned that sufficient alternating current in the proper phase is shunted through the field winding 7 to drive the fork at its resonance frequency, the approximate path of flow being designated by the double arrow line in Fig. 2. Thus winding 19 serves to vibrate the poles 2 and 3 as well as to furnish field excitation.

The operation of the system is started by separately exciting the field by means of a battery 8, and mechanically actuating the prongs 2 and 3 to vibrate at their natural frequency. As the system becomes resonant, the battery 8 is disconnected by throwing switch 15 to its other terminal, which, with the closure of switch 16, places the primary of the output transformer 14 in parallel with the field coil 7 across the brushes 9 and 10, and the reversal of switch 17 includes the condenser 18 in the field circuit.

As the armature 6 is rotated between the magnetized vibrating poles 2 and 3, the generated electromotive force will vary according to the variation in flux intensity caused by the alternating variation in the length of the air gap.

If $\phi$ represents the flux, N the number of conductors cutting the total flux in each revolution, and $f$ the revolutions per second, the electromotive force generated is:

$$E = \frac{2Nf\phi}{10^8} \text{ volts}$$

To a first approximation the flux is inversely proportional to the length of the air gap. Omitting the negligible variation in the permeability with flux density, and assuming a sinusoidal motion of the fork prongs:

$$\phi = \frac{K}{B + C \cos\omega t}$$

in which B is the total effective air gap when the fork is at rest, C is the amplitude of vibration, $\omega$ ($= 2\pi f$) is the angular velocity in the time $t$, and K is the field constant. Then:

$$E = \frac{2Nf}{10^8} \times \frac{K}{B + C \cos\omega t} = \frac{A}{B + C \cos\omega t}$$

where $$A = \frac{2NfK}{10^8}$$

This expression for E expanded in the Fourier series becomes:

$$E = \frac{A}{B}\left[ 1 + 2\left(\frac{C}{2B}\right)^2 + 6\left(\frac{C}{2B}\right)^4 + 20\left(\frac{C}{2B}\right)^6 + 70\left(\frac{C}{2B}\right)^8 + \cdots \right.$$
$$- 2\cos\omega t \left[\left(\frac{C}{2B}\right) + 3\left(\frac{C}{2B}\right)^3 + 10\left(\frac{C}{2B}\right)^5 + 35\left(\frac{C}{2B}\right)^7 + \cdots\right]$$
$$+ 2\cos 2\omega t \left[\left(\frac{C}{2B}\right)^2 + 4\left(\frac{C}{2B}\right)^4 + 15\left(\frac{C}{2B}\right)^6 + 56\left(\frac{C}{2B}\right)^8 + \cdots\right]$$
$$- 2\cos 3\omega t \left[\left(\frac{C}{2B}\right)^3 + \left(\frac{C}{2B}\right)^5 + \cdots\right]$$
$$\left. + \cdots \right]$$

Which, upon inspection, shows that the electromotive force generated is inversely proportional to the mean air gap, and that the ratio between the higher harmonics and the fundamental is much greater for large amplitudes than for small amplitudes, indicating the necessity of maintaining a small amplitude of vibration to obtain an output containing a small portion of harmonic frequencies.

Fig. 3 indicates graphically the above mentioned conditions in the relation between the variation in the flux intensity for a sinusoidal variation in the length of the air gap. Numerals 25 and 26 designate the respective sinusoids of the flux intensity and the length of the air gaps for large amplitudes of the vibrating fork, plotted between arbitrary linear ordinates and angular displacement abscissæ. Similarly, numerals 27 and 28 designate the sinusoids of the flux intensity and the length of the air gap respectively for small amplitudes, and show relatively that the ratio of the harmonics to the fundamental becomes less for small amplitudes of vibration.

Inasmuch as the generated electromotive force is directly proportional to the flux intensity, the flux intensity curves 25 and 27 indicate the relative values of the electromotive force generated. Furthermore, inasmuch as the flux intensity is inversely proportional to the length of the air gap, as indicated by the reversed order of flux curves 25 and 27 compared with the air gap curves 26 and 28, it follows that the generated electromotive force is inversely proportional to the mean air gap.

While this specification describes a preferred embodiment of my invention, it is understood that changes may be effected in form, construction, and proportion without departing from the spirit or scope of this invention within the appended claims.

What is claimed is:

1. An electric generator comprising a rotatable armature and a vibrating magnetizing field member.

2. An electric generator having a plurality of magnetizing field pole pieces vibrating at a constant frequency.

3. An electric generator comprising an armature rotatable between magnetized vibrating prongs of a tuning fork.

4. An alternating current generator comprising an armature rotatable between the vibrating prongs of a tuning fork, said prongs magnetized to opposite polarity, and said prongs vibrated by the generated current.

5. An electric generating machine comprising a magnetically vibrated magnetizing field member, and an armature rotatable in the field produced thereby, said field varying periodically in flux intensity, and said field inducing in said armature an alternating current of a frequency corresponding to said periodic magnetization.

6. In an electric generator, the combination with a generative armature, of magnetizing pole pieces vibrating harmonically, and means whereby said pole pieces are magnetically actuated by the generated current.

7. An electric generator comprising a magnetizing field member vibrating at a constant frequency, and an armature rotatable in the field produced thereby, said field inducing in said armature an alternating current having a frequency equal to that of the said magnetizing field.

8. An electric generator comprising an armature and a plurality of magnetizing pole pieces, said pole pieces vibrating at a constant frequency and producing a magnetic flux of a corresponding constant frequency, and said magnetic flux inducing in said armature an alternating current also of the said corresponding constant frequency.

9. In an electric generator, magnetizing field pole pieces vibrating at a constant frequency, and a generative armature rotatable in the field produced thereby, said magnetizing field inducing in said armature an alternating current having the same constant frequency.

10. In an alternating current generating system, a generative armature, and means for producing a magnetizing field of periodically varying flux intensity, said magnetizing field inducing in said armature electrical alternations of the same period of variation as said flux intensity.

11. An electric generator comprising a generative armature, and periodically vibrating magnetizing pole pieces, said pole pieces vibrated by the generated alternating current, and said pole pieces magnetized by the direct current component of the generated alternating current.

12. An alternating current generator comprising an armature, a plurality of magnetizing field pole pieces, a magnetizing field coil, a primary generator for exciting said field coil, said field coil adapted to magnetize said field pole pieces, means for rotating said armature, said rotated armature also adapted to excite said field coil, and means for disconnecting said primary generator when said armature is rotated to excite said field coil.

In witness whereof, I hereunto subscribe my name this 9th day of July A. D., 1924.

WARREN A. MARRISON.